Figure 1:
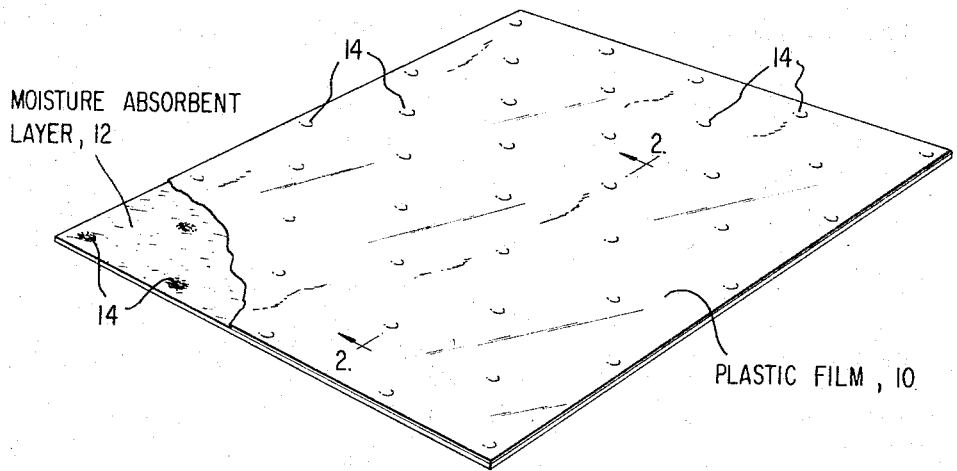

Sept. 19, 1967 F. B. SCHELHORN 3,342,613
CONSTRUCTION OF A BLANKET FOR MOISTURE-PACK
POULTRY SHIPPING SYSTEM
Filed Sept. 9, 1963

INVENTOR.
FREDERICK B. SCHELHORN
BY
*ATTORNEYS*

3,342,613
CONSTRUCTION OF A BLANKET FOR MOISTURE-
PACK POULTRY SHIPPING SYSTEM
Frederick B. Schelhorn, Toledo, Ohio, assignor to Owens-
Illinois Inc., a corporation of Ohio
Filed Sept. 9, 1963, Ser. No. 307,387
3 Claims. (Cl. 99—171)

This invention relates to material for wrapping comestible products, such as poultry, for refrigerated storage and shipment where it is necessary to enclose the product in an air-tight, waterproof wrapper that will not rupture under impact and thereby permit dehydration and freezer burns.

Prior art wrappers of this type are generally in the form of a laminate consisting of an outer layer of impermeable plastic material bonded throughout its surface to an inner layer of moisture absorbent, non-woven fabric or paper. The latter type of wrappers have had limited success because of the inability of the extrusion process to provide a plastic film of sufficient thickness and strength to stand up in use on the back of the absorbent, non-woven material. The limited success has primarily been due to the fact that the outer film of impermeable, plastic material is bonded to the surface of the moisture absorbent material. Consequently, small bones of a fowl or other abrupt surface irregularities in the product may puncture the packaging material and thereby destroy the seal and permit dehydration of the product. The plastic outer layer is unable to stretch and accommodate the abrupt iregularities in the surface of the wrapped product due to its being bonded to the non-stretchable inner layer of moisture absorbent material.

One of the objects of this invention is to provide an air-tight, waterproof packaging material for comestibles that will prevent dehydration of the comestible and will not rupture under ordinary impact.

A further object is to provide a flexible, air-tight waterproof blanket or wrapper for poultry and similar comestible products including an inner layer of moisture absorbent material that will lie in close, surface-to-surface contact with the product to form a water cushion about the comestible and an outer, impermeable layer of stretchable material that can move relative to the inner layer to accommodate abrupt surface irregularities and thereby resist puncture.

Another object lies in the provision of an impermeable blanket for comestibles in which an outer layer of air-tight, waterproof, stretchable material is capable of limited relative movement with respect to an inner layer of moisture absorbent fibrous material to increase the strength of the blanket.

The foregoing and other objects are achieved by the provision of an outer layer of plastic material, such as polyethylene or polyvinyl chloride film, to which is bonded at spaced points an inner layer of moisture absorbent, non-woven material such as wet strength towelling grade paper. The inner layer of paper is spot-bonded to the plastic film by a suitable waterproof glue such as polyvinyl acetate with the result that the film and paper are capable of relative movement in the unbonded areas. The aforementioned materials are exemplary only, and the invention is not limited thereto.

Figure 2:
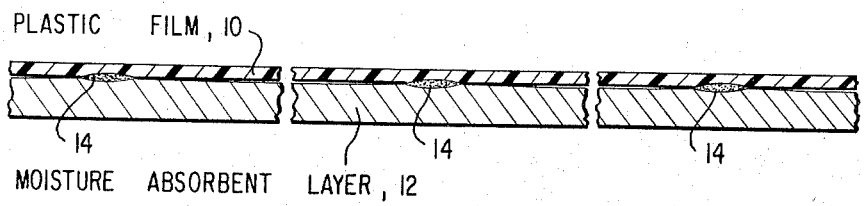

Other objects and advantages will become apparent from the following description taken in connection with the accompanying drawing in which FIG. 1 is a perspective view of a wrapper or blanket embodying the invention, and FIG. 2 is a magnified, diagrammatic sectional view taken on lines 2—2 of FIG. 1 illustrating the location of the adhesive material.

As shown in the drawing, the plastic film 10 is secured to the moisture absorbent material 12 by substantially uniformly distributed spots 14 of a waterproof adhesive. The thickness of the plastic film preferably may vary from 3 mils to 5 mils and the spacing of the bonding spots 14 may be varied as desired.

In the wrapping of poultry and similar products, the product is washed and, while soaked with water, is wrapped in the blanket with the moisture absorbent layer 12 next to the product. The capillary action of the water causes the non-woven material to adhere closely to the surface of the product and form a water cushion there-around. The film 10 of plastic material is impermeable and forms an air-tight seal around the product to prevent dehydration and freezer burns. Since the plastic film 10 and absorbent material 12 are spot bonded together, relative movement is permitted between the absorbent layer and the plastic film in the unbonded areas between the spots of adhesive. Consequently, the plastic film is able to stretch around abrupt irregularities in the surface of the product independently of the absorbent layer and will not puncture.

With respect to a specific example of the preferred embodiment of this invention, I prefer to use a low density polyethylene film having a thickness of approximately three mils. The film is electrostatically treated or flame treated on one surface to improve the adhesive bonding characteristics of that surface. A film of this type can be elongated 350% in either planar direction before rupturing.

While any suitable adhesive can be employed, I prefer to use a highly plasticized polyvinyl-acetate based adhesive having a viscosity of 3400–3600 centipoises at 25° C. For a rectangular blanket having a size of 48" by 54", the adhesive is applied in a uniform pattern as ½" squares or ½" diameter circular spots located on 2" centers.

The preferred absorbent material is slightly creped wet-strength paper towelling having a basis weight of eight pounds per thousand square feet. The wet-strength additive is a urea-formaldehyde polymer. A paper of this type is marketed by Brown Company of Berlin, New Hampshire under the designation #2200 towelling. This towelling, which is typical, will under maximum load, elongate 4.3% in the machine direction and 3.9% in the cross-machine direction. Comparing the foregoing with the permissible elongation in plastic film, it can be readily seen that plastic film will stretch without rupturing, when permitted to do so, to a far greater degree than the absorbent material. Continuity of the plastic film in a blanket of this type is of primary importance.

Additionally, comparative tests give the unexpected result that there is a 33% improvement in the wicking characteristics of the blanket in going from overall lamination to spot lamination. This characteristic is important in maintaining uniform disposition of the liquid about the packaged comestibles.

While I have described and illustrated one embodiment of my invention, I wish it understood that I do not intend to be restricted solely thereto but that I do intend to cover all modifications thereof which would be apparent to one skilled in the art and which come within the scope and spirit of the invention.

What is claimed is:

1. A blanket for enclosing comestibles having protruding segments within a high moisture environment for storage under refrigeration comprising a sheet of highly coherent, water absorbent, single ply paper, a thin film of moisture impermeable, stretchable plastic material overlying said sheet, and spots of water-proof adhesive between said single ply sheet and stretchable film at widely spaced intervals approximating two inches between centers bonding said sheet to said film at said spots with the bonded areas being substantially less than the unbonded areas and each unbonded area between adjacent bonded spots having a larger area than the cross section of the protruding segments of the comestibles, each said bond being a tight, integral structure developing substantially the tear strength of the full thickness of said single ply sheet and adjacent bonds being anchor points between which said unbonded areas of film move independently and stretch relative to said underlying unbonded areas of paper sheet to accommodate protruding segments of the wrapped comestible and not puncture the blanket.

2. The blanket described in claim 1 wherein said plastic material is from the group of polymers consisting of polyethylene and polyvinyl chloride and the thickness of said film is no greater than five mils.

3. In a blanket for wrapping comestibles having protruding segments for storage and shipment in which the blanket comprises a thin film of moisture vapor impermeable material overlying a sheet of highly water absorbent paper for being wrapped in a wetted state around and in contact with the comestibles to maintain them in a high moisture environment, the improvement wherein said film is a plastic material stretchable up to approximately 350 percent without rupture, said sheet of paper is a highly coherent, single ply sheet, and said sheet and film are bonded together with water-proof adhesive at widely spaced intervals at least two inches on centers with the areas of bonding being less than one sixth the unbonded areas and each unbonded area between adjacent bonded spots having a larger area than the cross section of the protruding segments of the comestibles, said adhesive forming a high strength integral bond between said film and sheet developing substantially the tear strength of the full thickness of said single ply sheet and establishing anchor points to accommodate independent relative movement between the unbonded areas of said sheet and film and stretching of the unbonded areas of said film without rupture between adjacent bonded areas around protruding segments of the wrapped comestibles to prevent rupture of the blanket.

References Cited
UNITED STATES PATENTS

| | | | |
|---|---|---|---|
| 2,667,436 | 1/1954 | Goepfert et al. | 161—148 |
| 2,709,293 | 5/1955 | Schwaderer et al. | 161—148 |
| 2,897,109 | 7/1959 | Voigtman | 161—148 |
| 3,047,445 | 7/1962 | Gresham | 161—148 |
| 3,099,572 | 7/1963 | Rion et al. | |
| 3,111,412 | 11/1963 | Mouk | 99—192 |

MORRIS SUSSMAN, *Primary Examiner.*

EARL M. BERGERT, *Examiner.*